United States Patent
Kinoshita et al.

(10) Patent No.: US 9,257,730 B2
(45) Date of Patent: Feb. 9, 2016

(54) HEATER MODULE

(75) Inventors: Yukiko Kinoshita, Okegawa (JP); Naoto Todoroki, Sagamihara (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/003,952

(22) PCT Filed: Mar. 7, 2012

(86) PCT No.: PCT/JP2012/055746
§ 371 (c)(1),
(2), (4) Date: Sep. 9, 2013

(87) PCT Pub. No.: WO2012/124556
PCT Pub. Date: Sep. 20, 2012

(65) Prior Publication Data
US 2013/0344370 A1    Dec. 26, 2013

(30) Foreign Application Priority Data
Mar. 11, 2011 (JP) ................................. 2011-054089
Feb. 22, 2012 (JP) ................................. 2012-035738

(51) Int. Cl.
| | |
|---|---|
| *H01M 10/6571* | (2014.01) |
| *H01M 10/615* | (2014.01) |
| *H05B 3/26* | (2006.01) |
| *H05B 3/06* | (2006.01) |
| *H01M 10/625* | (2014.01) |
| *H01M 10/647* | (2014.01) |
| *H01M 10/6562* | (2014.01) |

(52) U.S. Cl.
CPC ........ *H01M 10/5006* (2013.01); *H01M 10/615* (2015.04); *H01M 10/625* (2015.04); *H01M 10/647* (2015.04); *H01M 10/6562* (2015.04); *H01M 10/6571* (2015.04); *H05B 3/06* (2013.01); *H05B 3/26* (2013.01)

(58) Field of Classification Search
None
See application file for complete search history.

(56) References Cited

U.S. PATENT DOCUMENTS 4,081,737 A * 3/1978 Miyahara ..................... 320/107
5,508,126 A    4/1996 Braun
(Continued)

FOREIGN PATENT DOCUMENTS

CN      1100252 A    3/1995
EP      0 632 344 A2    1/1995
(Continued)

OTHER PUBLICATIONS

Morita et al., Battery Pack, JP 2007-213939, Aug. 23, 2007, Machine translated to English.*

(Continued)

*Primary Examiner* — Patrick Ryan
*Assistant Examiner* — Jose Colucci Rios
(74) *Attorney, Agent, or Firm* — Foley & Lardner LLP (57) ABSTRACT

A heater module (22L, 22R) of the present invention is provided along a heated surface (13CLa) of an object to be heated (13CL, 13CR). The heater module includes: a plate-like heater body (34) that faces the heated surface of the object to be heated; an L-shaped member (31) including a module main surface (31m) to which the plate-like heater body is provided, and a bent arm portion (31c) bent with respect to the module main surface; and a power source connection terminal (35) provided in the bent arm portion and connected to the plate-like heater body.

7 Claims, 6 Drawing Sheets

(56) References Cited

U.S. PATENT DOCUMENTS

| | | | |
|---|---|---|---|
| 5,599,636 A * | 2/1997 | Braun | 429/7 |
| 5,705,272 A * | 1/1998 | Taniguchi | 428/408 |
| 7,964,827 B2 | 6/2011 | Suzuki et al. | |
| 2008/0096072 A1* | 4/2008 | Fukusako et al. | 429/26 |
| 2008/0198897 A1* | 8/2008 | Suzuki et al. | 374/152 |
| 2010/0015513 A1 | 1/2010 | Nakahama et al. | |

FOREIGN PATENT DOCUMENTS

| | | |
|---|---|---|
| EP | 1 143 541 A1 | 10/2001 |
| JP | 6-348154 A | 12/1994 |
| JP | 7-502373 A | 3/1995 |
| JP | 9-190840 A | 7/1997 |
| JP | 2000-243435 A | 9/2000 |
| JP | 3131704 U | 5/2007 |
| JP | 2007-213939 A | 8/2007 |
| JP | 2008-186621 A | 8/2008 |
| KR | 10-2008-0109959 A | 12/2008 |
| WO | WO 2009/110524 A1 | 9/2009 |

OTHER PUBLICATIONS

Chinese Office Action dated Jun. 17, 2014, 6 pgs.

Andreas Vlahinos et al., Energy Efficient Battery Heating in Cold Climates, *Future Car Congress*, Jun. 5, 2002.

Supplementary European Search Report dated Nov. 4, 2014, 7 pgs.

Korean Office Action and English translation, dated Jun. 27, 2014, 5 pgs.

Flexible Heaters Design Guide Minco (Published 2007), pp. 1-63.

\* cited by examiner

HEATER MODULE

TECHNICAL FIELD

The present invention relates to a heater module effective in controlling the temperature of a battery module made by stacking a number of battery shells.

BACKGROUND ART

There is known a heater module used to control the temperature of a battery module made by stacking a number of battery shells, as described in Patent Literature 1.

In Patent Literature 1, a heater body tightly contacts the outer side surface of a casing of a battery pack that stores a number of battery modules, and the heater module is attached to the casing of the battery pack by using a heater unit casing. Also, a heat insulating sheet is placed between the surface of the heater body that faces away from the outer side surface of the casing of the battery pack, and the heater unit casing.

CITATION LIST

Patent Literature

Patent Literature 1: Japanese Patent Unexamined Publication No. 2008-186621

SUMMARY OF INVENTION

However, in the heater module described in Patent Literature 1, the battery modules, which are objects to be heated by the heater body, are not heated directly by the heater body. Specifically, the casing of the battery pack that stores the battery modules is heated by the heater body, and the battery modules are indirectly heated by heat conduction from the casing of the battery pack to the battery modules. Therefore, there has been a problem that heating efficiency for the battery modules is low.

In order to solve this problem, it is considered to provide the heater body in the casing of the battery pack and arrange the heater body adjacent to the battery modules so as to heat the battery modules directly by the heater body. However, since the battery pack is downsized by eliminating extra space inside the casing, there is not sufficient space for the heater body and a holder to hold the heater body in the battery pack.

Here, a power source connection terminal is generally provided in the heater module so as to connect the heater body to a heater harness to supply electrical power to the heater body. However, since the heater module is formed thinly, it is difficult to arrange the power source connection terminal in the conventional heater module without changing the thickness and size of the heater module.

The present invention has been accomplished in view of the conventional problem. An object of the present invention is to provide a heater module capable of arranging a power source connection terminal therein without increasing the thickness and size of the heater module.

A heater module according to an aspect of the present invention is provided along a heated surface of an object to be heated. The heater module includes: a plate-like heater body that faces the heated surface of the object to be heated; an L-shaped member including a module main surface to which the plate-like heater body is provided, and a bent arm portion bent with respect to the module main surface; and a power source connection terminal provided in the bent arm portion and connected to the plate-like heater body.

DESCRIPTION OF EMBODIMENTS

An embodiment of the present invention will be described below with reference to the drawings. It should be noted that dimensional ratios in the drawings are magnified for convenience of explanation, and may be different from actual ratios.

[Battery Pack]

Figure 1:
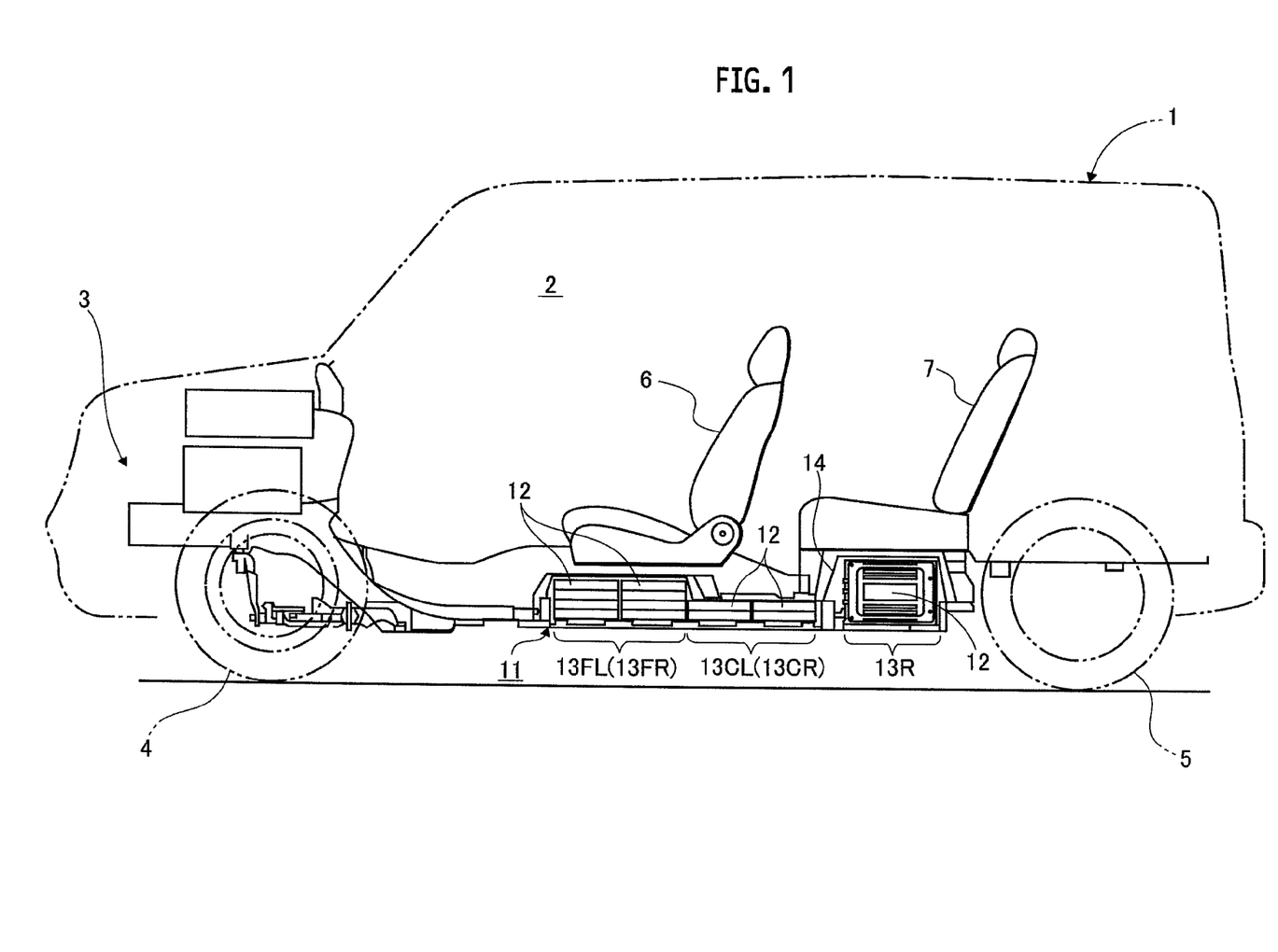
FIG. 1 is a side view showing a state where a battery pack, which employs a heater module according to an embodiment of the present invention, is attached inside of a battery storage space directly beneath a vehicle floor panel.
Figure 2:
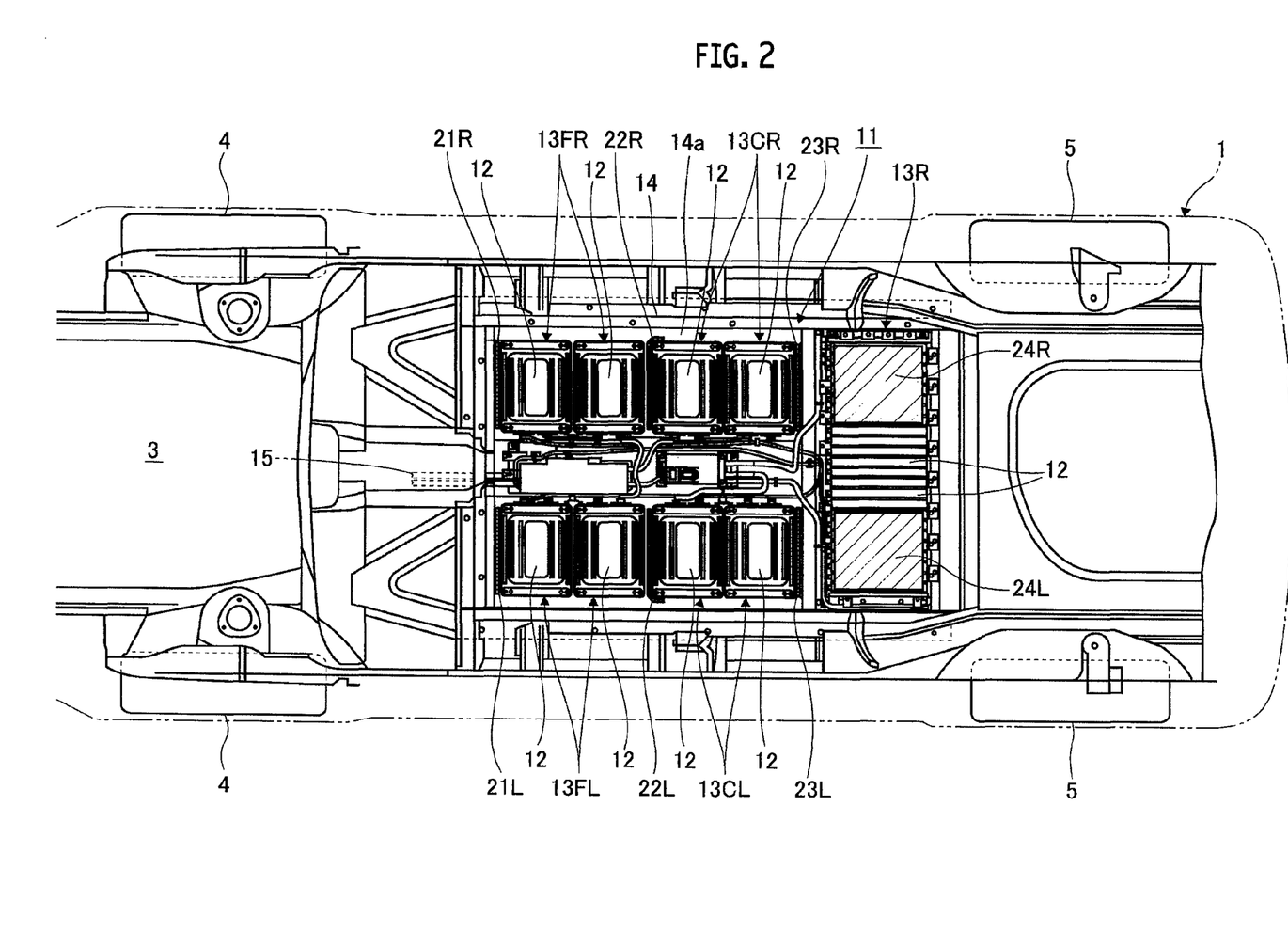
FIG. 2 is a plan view showing a state where the battery pack shown in FIG. 1 is attached inside of the battery storage space directly beneath the vehicle floor panel.
Figure 3:
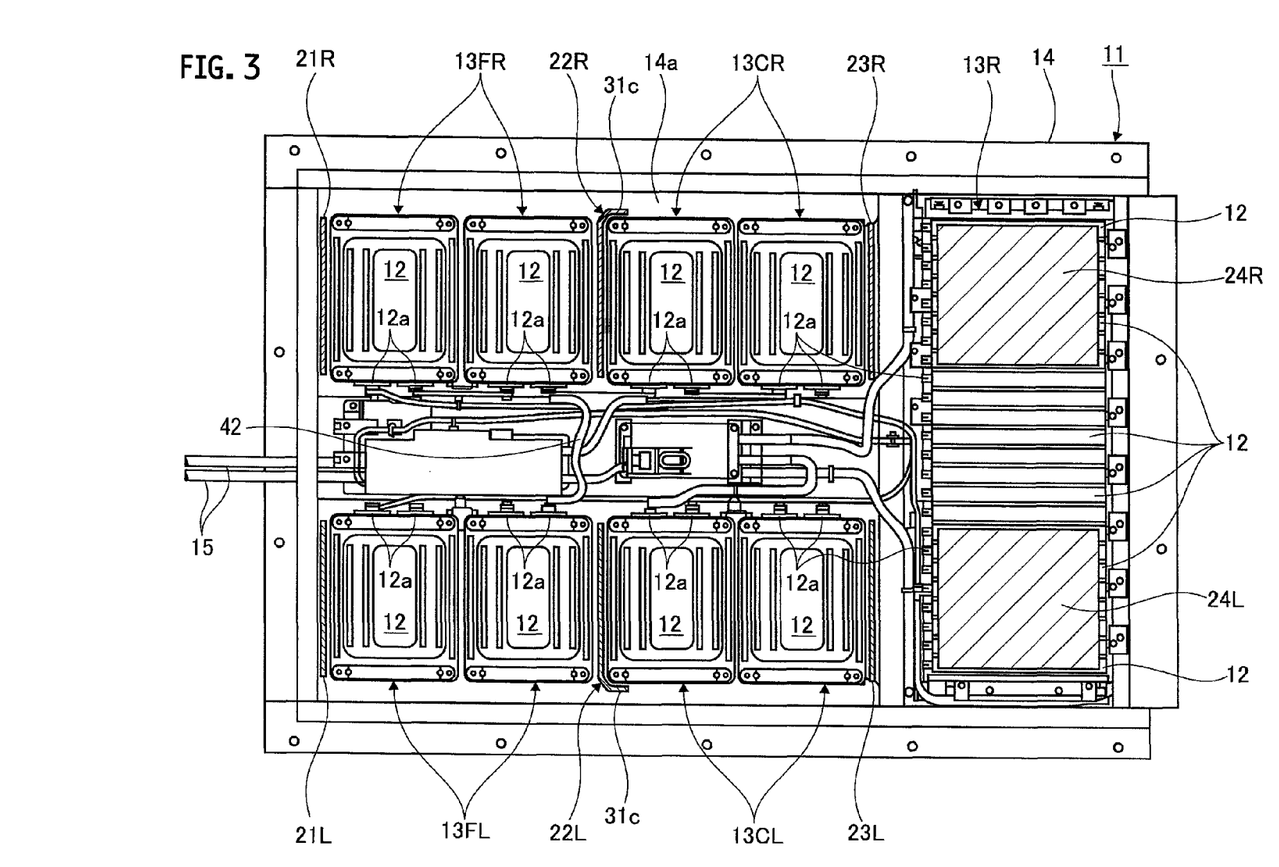
FIG. 3 is a plan view of the battery pack, showing a state where the battery pack shown in FIG. 2 is removed from the battery storage space directly beneath the vehicle floor panel.

First, the vehicle battery pack shown in FIG. 1 to FIG. 3 is explained below. In FIG. 1 and FIG. 2, reference numeral 1 denotes a vehicle body, reference numeral 2 denotes an interior space, and reference numeral 3 denotes a motor compartment in which an electric motor for driving is mounted. Further, reference numeral 4 denotes left and right front wheels, reference numeral 5 denotes left and right rear wheels, reference numeral 6 denotes a front seat, reference numeral 7 denotes a rear seat, and reference numeral 11 denotes a vehicle battery pack.

The battery pack 11 includes a plurality of battery modules 13FL, 13FR, 13CL, 13CR, and 13R, each of which is made by stacking a number of battery shells 12. The battery modules 13FL, 13FR, 13CL, 13CR, and 13R are stored in a common battery pack casing 14 to configure a single unit, as shown in FIG. 3.

In particular, the battery modules 13FL on the front left side and the battery modules 13FR on the front right side are provided directly beneath the floor panel provided under the left and right front seats 6, as shown in FIG. 1 and FIG. 2. Also, the battery module 13R at the rear is provided directly beneath the floor panel at the left and right rear seats 7. Moreover, the battery modules 13CL on the center left side and the battery modules 13CR on the center right side are provided directly underneath the floor panel that is located under feet in the rear seats and extends between the left and right front seats 6 and the left and right rear seats 7. The battery pack 11 holds and stores these battery modules in the battery pack casing 14 so as to configure a single unit.

As shown in FIG. 1 to FIG. 3, in the battery modules 13FL on the front left side, four of the battery shells 12 are stacked in a vertical direction and transversely with respect to the vehicle front-rear direction. Two of the modules, each having four of the battery shells 12, are apposed in the vehicle front-rear direction as a pair. Similarly, in the battery modules 13FR on the front right side, four of the battery shells 12 are stacked in the vertical direction and transversely with respect to the vehicle front-rear direction. Two of the modules, each having four of the battery shells 12, are apposed in the vehicle front-rear direction as a pair.

Further, as shown in FIG. 1 to FIG. 3, in the battery module 13R at the rear, a number of the battery shells 12 are placed longitudinally with respect to the vehicle front-rear direction and stacked in the vehicle width direction. The battery shells 12 in the battery module 13R are stacked so as to have almost the same length as the entire length of the rear seats 7.

Further, as shown in FIG. 1 to FIG. 3, in the battery modules 13CL on the center left side, two of the battery shells 12 are placed transversely with respect to the vehicle front-rear direction and stacked in the vertical direction. Two of the modules, each having two of the battery shells 12, are apposed in the vehicle front-rear direction as a pair. Similarly, in the battery modules 13CR on the center right side, two of the battery shells 12 are placed transversely with respect to the vehicle front-rear direction and stacked in the vertical direction. Two of the modules, each having two of the battery shells 12, are apposed in the vehicle front-rear direction as a pair.

As shown in FIG. 3, electrode terminals 12a are provided in the battery shells 12 that form the battery modules 13FL on the front left side and the battery modules 13FR on the front right side. The battery modules 13FL and 13FR are arranged in a manner such that the electrode terminals 12a of the battery modules 13FL and the electrode terminals 12a of the battery modules 13FR face each other.

Further, the electrode terminals 12a are provided in the battery shells 12 that form the battery modules 13CL on the center left side and the battery modules 13CR on the center right side. The battery modules 13CL and 13CR are arranged in a manner such that the electrode terminals 12a of the battery modules 13CL and the electrode terminals 12a of the battery modules 13CR face each other.

As shown in FIG. 3, the battery module 13R at the rear is arranged in a manner such that all of the electrode terminals 12a of the battery shells 12 that form the battery module 13R, face to the front of the vehicle.

As shown in FIG. 2 and FIG. 3, a common power supply cable 42 is arranged in the space at the midpoint in the vehicle width direction between the battery modules 13FL and 13FR on the front side, and in the space at the midpoint in the vehicle width direction between the battery modules 13CL and 13CR at the center. The electrode terminals 12a of the battery shells 12 that form each of the battery modules 13FL, 13FR, 13CL, 13CR, and 13R are connected to motor power-supply lines 15 through the power supply cable 42. The motor power-supply lines 15 are electrically connected to an electric motor and an inverter in the motor compartment 3.

[Heater Module]

Next, heater modules in the battery pack 11 are explained below based on FIG. 2 and FIG. 3. In FIG. 2 and FIG. 3, hatching has been added to the heater modules for convenience of explanation.

The heater modules function to heat the battery modules 13FL, 13FR, 13CL, 13CR, and 13R in the battery pack 11 in order to prevent the battery modules from freezing when not in use. In other words, the battery modules 13FL and 13FR on the front side have a large heat capacity, as four of the battery shells 12 are stacked therein as explained above. In contrast, since the battery modules 13CL and 13CR at the center are each made of two stacked battery shells 12 and thus have a small heat capacity, the temperature thereof easily decreases. Hence, in this embodiment, the thin heater modules 21L and 21R are provided only on the front sides of the battery modules 13FL and 13FR, as shown in FIG. 2 and FIG. 3. But for the battery modules 13CL and 13CR at the center, the thin heater modules 22L and 22R are provided on the front sides thereof, and the thin heater modules 23L and 23R are provided on the rear sides thereof.

The battery module 13R at the rear includes the stacked battery shells 12 more than the battery modules 13FL and 13FR on the front side. The battery module 13R thus has the largest heat capacity, and the temperature thereof does not easily decrease. Therefore, in the battery module 13R at the rear, the heater modules 24L and 24R are provided only above both ends of the battery shells 12 in the stacking direction.

The heater modules 21L and 21R are arranged adjacent to the front sides of the battery modules 13FL on the front left side and the battery modules 13FR on the front right side, respectively, in a vertical state. Also, the heater modules 22L and 22R are arranged adjacent to the front sides of the battery modules 13CL on the center left side and the battery modules 13CR on the center right side, respectively, in a vertical state. Further, the heater modules 23L and 23R are arranged adjacent to the rear sides of the battery modules 13CL on the center left side and the battery modules 13CR on the center right side, respectively, in a vertical state. As explained below, the heater modules 21L, 21R, 22L, 22R, 23L and 23R are attached and fixed to a battery module mounting surface 14a of the battery pack casing 14.

The heater modules 24L and 24R are provided on both ends of the battery module 13R at the rear in the stacking direction of the battery shells. In addition, the heater modules 24L and 24R are attached and fixed to the top of the stacked battery module 13R, in other words, on side surfaces of the stacked battery module 13R.

As described above, the power supply cable 42 is arranged in the space at the midpoint between the battery modules 13FL and 13FR on the front side, and in the space at the midpoint between the battery modules 13CL and 13CR at the center. As described below, each heater module includes a power source connection terminal that electrically connects a plate-like heater body 34 having a plate-like heating element 32 and a heat equalizing plate 33, to the power supply cable 42. Therefore, the power source connection terminals of the heater modules 21L and 21R are preferably installed towards and close to the space at the midpoint between the battery modules 13FL and 13FR on the front side. Similarly, the power source connection terminals of the heater modules 22L, 22R, 23L, 23R, 24L and 24R are preferably installed towards and close to the space at the midpoint between the battery modules 13CL and 13CR at the center.

Accordingly, the power source connection terminals of the heater modules 21L and 21R arranged on the front sides of the battery modules 13FL on the front left side and the battery modules 13FR on the front right side, are located in mutually proximate end portions of the heater modules 21L and 21R. Also, the power source connection terminals of the heater modules 23L and 23R arranged on the rear sides of the battery modules 13CL on the center left side and the battery modules 13CR on the center right side, are located in mutually proximate end portions of the heater modules 23L and 23R. Hence, as shown in FIG. 2 and FIG. 3, the heater modules 21L and 21R, and the heater modules 23L and 23R can be formed into a plate shape.

As shown in FIG. 3, there is no neighboring battery module on the front sides of the battery modules 13FL and 13FR. Therefore, it is possible to secure spaces for placing the power source connection terminals in the peripheries of the mutually proximate end portions of the heater modules 21L and 21R, and this enables the power source connection terminals of the heater modules 21L and 21R to be arranged in the manner explained above. Similarly, there is no neighboring battery module at the rear of the battery modules 13CL and 13CR. Therefore, it is possible to secure spaces for placing the power source connection terminals in the peripheries of the mutually proximate end portions of the heater modules 23L and 23R, and this enables the power source connection terminals of the heater modules 23L and 23R to be arranged in the manner explained above.

On the other hand, the battery modules 13FL on the front left side and the battery modules 13FR on the front right side are arranged next to the vehicle front sides of the battery modules 13CL on the center left side and the battery modules 13CR on the center right side, respectively. Therefore, it is difficult to secure spaces for arranging the power source connection terminals of the heater modules 22L and 22R in the peripheries of the mutually proximate end portions of the heater modules 22L and 22R arranged on the front sides of the battery modules 13CL and 13CR at the center.

Figure 4:
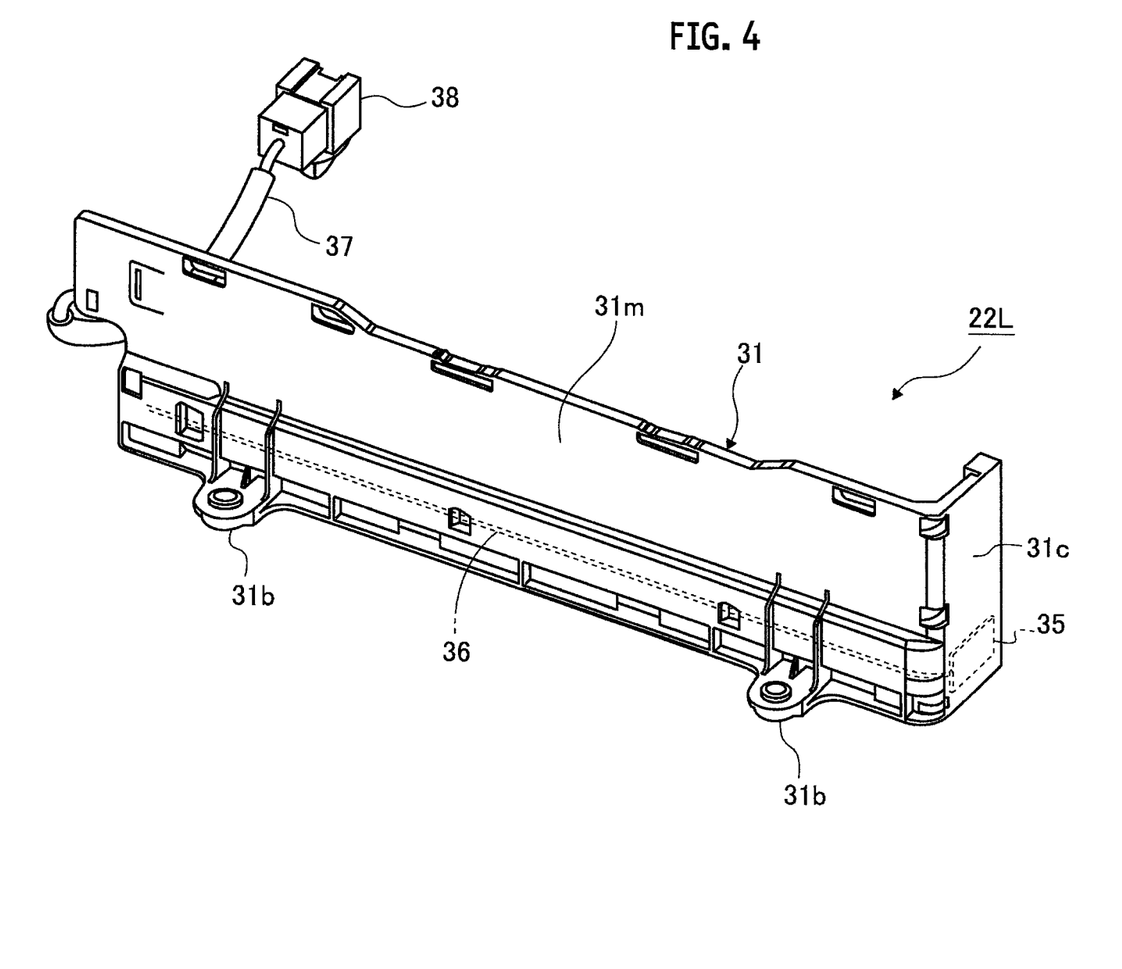
FIG. 4 is a perspective view showing the heater module according to the embodiment of the present invention used for the battery pack shown in FIG. 2 and FIG. 3.
Figure 5:
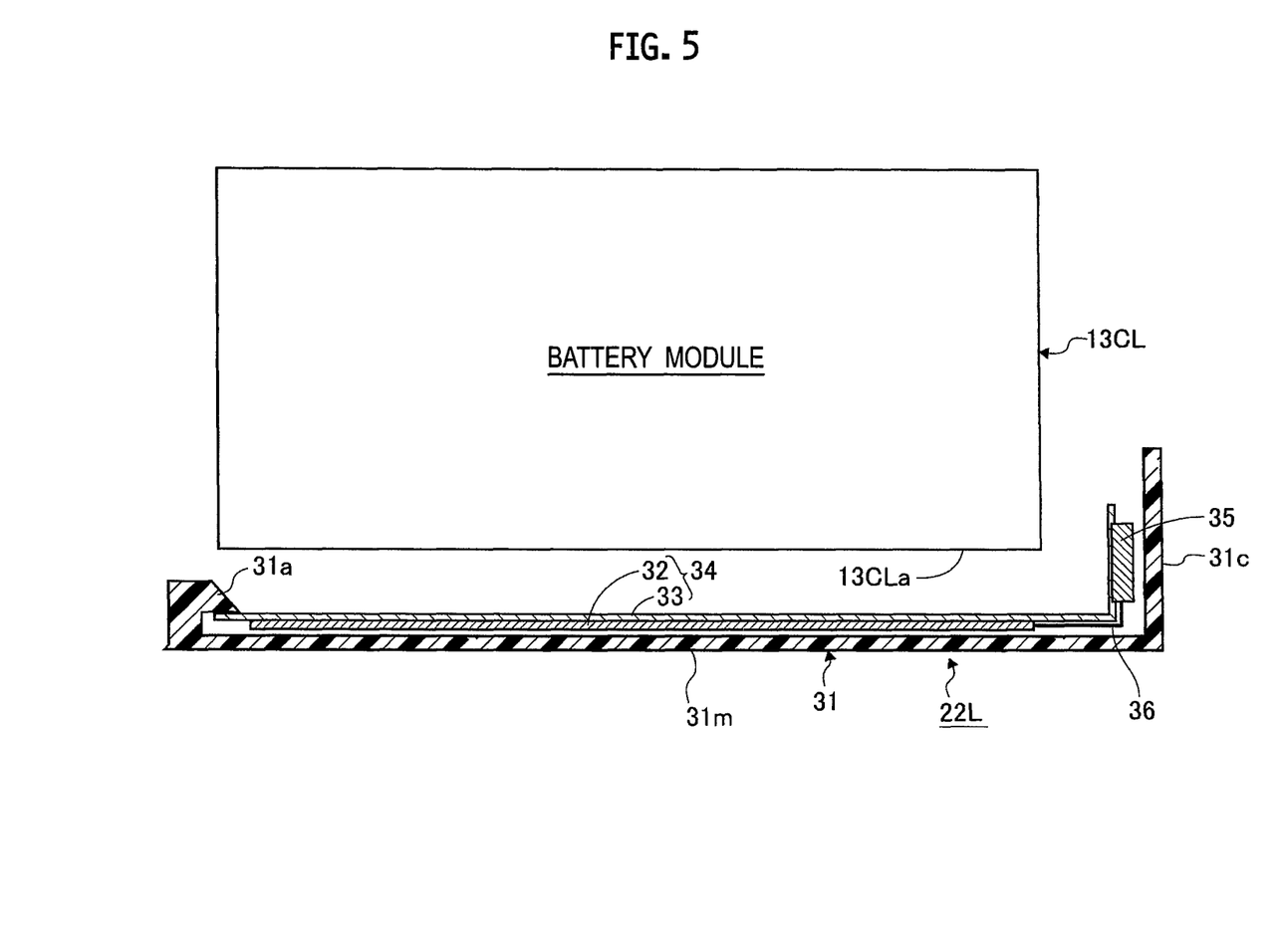
FIG. 5 is a longitudinal cross-sectional view of the heater module shown in FIG. 4.
Figure 6:
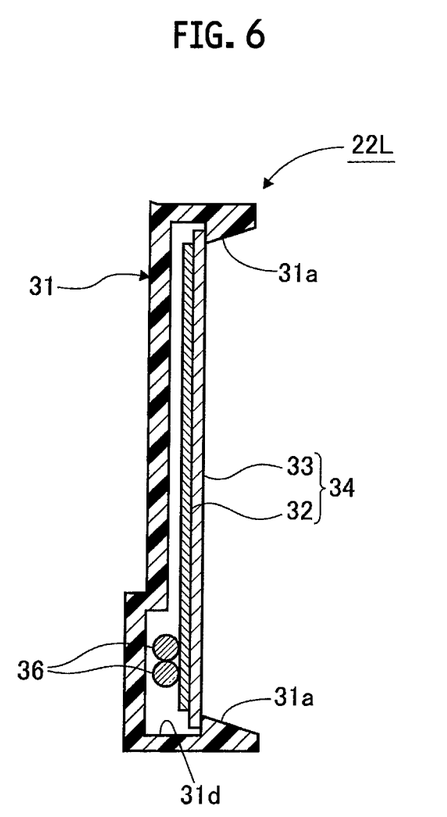
FIG. 6 is a vertical cross-sectional view of the heater module shown in FIG. 4.

Thus, in this embodiment, the heater modules 22L and 22R arranged in a vertical state on the front sides of the battery modules 13CL and 13CR at the center, have the configuration shown in FIG. 4 to FIG. 6. FIG. 4 is a perspective view showing the entire heater module 22L, FIG. 5 is a longitudinal cross-sectional view of the heater module 22L, and FIG. 6 is a vertical cross-sectional view of the heater module 22L. As shown in FIG. 4 to FIG. 6, the heater module 22L includes an insulating holder 31 made of an insulating material such as a resin, and the plate-like heater body 34 made by joining the plate-like heating element 32 and the heat equalizing plate 33 together. The plate-like heating element 32 is a conductor that generates Joule heat by allowing an electric current from the power supply cable 42 to pass therethrough. The heat equalizing plate 33 is a plate-like body that equally transfers heat generated by the plate-like heating element 32 to the battery modules.

As shown in FIG. 5 and FIG. 6, the plate-like heater body 34 is placed along one side surface of the insulating holder 31. In this case, the plate-like heating element 32 of the plate-like heater body 34 is located on the side closer to the insulating holder 31, and the heat equalizing plate 33 is located in a manner as to be exposed on the side away from the insulating holder 31. A plurality of heater body locking portions 31a capable of snap-fit type locking is provided in edge portions of the insulating holder 31. With these heater body locking portions 31a, the insulating holder 31 can lock the plate-like heater body 34 in the above-mentioned layout. This locked state can provide a layer of air between the insulating holder 31 and the plate-like heating element 32.

The heater module 22L having the foregoing configuration is provided with lugs 31b at the bottom of the insulating holder 31, as shown in FIG. 4. The heater module 22L in a vertical state is attached onto the battery module mounting surface 14a of the battery pack casing 14 via these lugs 31b. In this case, as shown in FIG. 5, the heater module 22L is attached in a manner such that the heat equalizing plate 33 of the plate-like heater body 34 proximately faces a heated surface 13CLa located on one side of the battery module 13CL in a laid state.

As shown in FIG. 5, the plural heater body locking portions 31a are integrally formed in the insulating holder 31 in a manner as to project from the plate-like heater body 34 toward the heated surface 13CLa of the battery module 13CL on the center left side.

As explained above, the battery modules 13FL and 13FR on the front side are arranged immediately next to the vehicle front sides of the battery modules 13CL and 13CR at the center, respectively. Therefore, it is difficult to secure spaces for arranging the power source connection terminals of the heater modules 22L and 22R in the peripheries of the mutually proximate end portions of the heater modules 22L and 22R arranged on the front sides of the battery modules 13CL and 13CR.

Thus, in the present embodiment, each of the insulating holders 31 of the heater modules 22L and 22R is bent at least on one side in the extending direction along the battery module mounting surface 14a, as shown in FIG. 4 and FIG. 5. In other words, the end portions in the longitudinal direction of the heater modules 22L and 22R that are towards the vehicle side, are bent along corner portions of the corresponding battery modules 13CL and 13CR with respect to main surfaces 31m onto which the plate-like heater bodies 34 are attached. Each of the insulating holders 31 is formed as an L-shaped member composed of the main surface 31m on which the plate-like heater body 34 is placed, and the bent end portion 31c bent with respect to the main surface 31m.

As shown in FIG. 3, the bent end portions 31c of the insulating holders 31 are located outside of the region where the corresponding battery modules 13CL on the center left side and battery modules 13CR on the center right side are mounted. Normally, an extra space is generally made outside of the mounting region for the battery modules 13CL on the center left side and the battery modules 13CR on the center right side, for safety reasons at the time of a side impact crash of another vehicle. Therefore, it is possible to place the bent end portions 31c of the insulating holders 31 in this extra space.

As shown in FIG. 4 and FIG. 5, the power source connection terminal of the heater module 22L, that is, the power source connection terminal 35 connected to the plate-like heater body 34, is provided on the inner side of the bent end portion 31c of the insulating holder 31. Namely, the power source connection terminal 35 is attached to the L-shaped end portion of the heat equalizing plate 33 extending along the inner side of the bent end portion 31c. As shown in FIG. 6, a heater harness 36 extending from the power source connection terminal 35 is stored in a harness cabling groove 31d provided in the main surface 31m of the insulating holder 31. Further, as shown in FIG. 4, the heater harness 36 is extended to the opposite end of the insulating holder 31 where the end portion of the heater harness 36 is connected to a lead wire 37 provided in the end portion of the insulating holder 31.

Moreover, a connector 38 is provided in the distal end of the lead wire 37. This connector 38 is electrically connected to the power supply cable 42 that is arranged in the space at the midpoint in the vehicle width direction as explained above. Thus, an electric current is fed from the power source to the heater module 22L, in other words, to the plate-like heating element 32 of the plate-like heater body 34.

It could be considered that the power source connection terminal 35 of the plate-like heater body 34 is arranged at the midpoint of the insulating holder 31 in a longitudinal direction, and is placed between the insulating holder 31 and the plate-like heating element 32. In this case, however, the thickness of the heater module 22L is increased, and the heater module 22L cannot be inserted into the limited space between the battery modules 13CL on the center left side and the battery modules 13FL on the front left side.

[Effects of the Embodiment]

The heater module 22L for the battery module 13CL on the center left side of the heater modules according to the present embodiment, includes the plate-like heater body 34 that faces the heated surface 13CLa of the battery module 13CL in the laid state. As shown in FIG. 5, the insulating holder 31 is fixed, at one edge, onto the battery module mounting surface 14a on which the battery module 13CL is mounted. The insulating holder 31 is placed on the surface (on the back surface) of the plate-like heater body 34 away from the heated surface 13CLa of the battery module 13CL. Since the insulating holder 31 holds the plate-like heater body 34 to come face-to-face with the heated surface 13CLa, the plate-like heater body 34 directly heats the heated surface 13CLa. Further, the presence of the layer of air between the heated surface 13CLa and the plate-like heater body 34 in addition to the layer of air between the back surface of the plate-like heater body 34 and the insulating holder 31, can enhance the effect of heating the battery module 13CL.

The plate-like heater body 34 is composed of the plate-like heating element 32 and the heat equalizing plate 33 joined together in a manner such that the heat equalizing plate 33 faces the heated surface 13CLa. This arrangement allows the heat equalizing plate 33 to heat the heated surface 13CLa evenly, thereby preventing an uneven temperature distribution in the heated surface 13CLa.

The heater body locking portions 31a, which are provided at other edges on the opposite side of the one edge of the insulating holder 31 to lock the plate-like heater body 34, project toward the heated surface 13CLa from the plate-like heater body 34. These heater body locking portions 31a serving as regulation members hit the heated surface 13CLa when the heater module 22L vibrates or is inclined, and thereby prevent the plate-like heater body 34 from coming into contact with the heated surface 13CLa. Accordingly, damage to the plate-like heater body 34 or electric leakage caused by the contact with the heated surface 13CLa can be prevented. This effect can be achieved simply by providing the heater body locking portions 31a in the insulating holder 31 to project in the manner described above. Such an effect is possible with the inexpensive and simple configuration and therefore, has a significant advantage in cost and weight.

Further, the end portions of the insulating holders 31 away from the space at the midpoint in the vehicle width direction, are bent along the corner portions of the corresponding battery module 13CL on the center left side and battery module 13CR on the center right side. Namely, the insulating holders 31 are each formed into an L-shape composed of the main surface 31m on which the plate-like heater body 34 is located, and the bent end portion 31c bent with respect to the main surface 31m. In addition, the power source connection terminal 35 of the plate-like heater body 34 is provided in the bent end portion 31c. Since the power source connection terminal 35 is not provided on the main surface 31m of the heater module 22L, the original thickness of the heater module 22L does not change. Further, since the power source connection terminal 35 for the heater module 22L is provided in the bent end portion 31c, the original size of the heater module 22L does not change, either.

Further, the insulating holder 31 formed into an L-shape prevents air heated by the plate-like heater body 34 from flowing outward in the vehicle width direction where heat exchange with external air is relatively caused. Accordingly, the efficiency of heating the battery module 13CL on the center left side and the battery module 13CR on the center right side, can be improved.

As described above, the space for the heater module 22L is limited since the heater module 22L is located close to the heated surface 13CLa of the battery module 13CL to heat the battery module 13CL directly by the plate-like heater body 34. Even in such a case, however, since the power source connection terminal 35 for the heater module 22L according to the present embodiment is provided in the bent end portion 31c that is placed in the small space provided in case of a side impact crash. Thus, the heater module 22L can surely be installed between the battery module 13FL on the front left side and the battery module 13CL on the center left side even when the installation space is limited.

The heat equalizing plate 33 formed into an L-shape extending along the bent end portion 31c can also heat a part of the side surface of the battery module 13CL in addition to the heated surface 13CLa. This improves the efficiency of heating the battery module 13CL.

Further, the bent end portions 31c of the insulating holders 31 increase the intensity of fixation of the heater module 22L at the time of vibration or inclination. Accordingly, damage to the plate-like heater body 34 or electric leakage caused by the contact with the heated surface 13CLa can surely be prevented.

The bent end portions 31c of the insulating holders 31 are located outside of the region, but within the battery module mounting surface 14a of the battery pack casing 14, where the corresponding battery modules 13CL on the center left side and battery modules 13CR on the center right side are mounted. Thus, the bent end portions 31c of the insulating holders 31 can be provided while utilizing the extra space provided for safety reasons at the time of a side impact crash of another vehicle.

The extra space in which the bent end portions 31c of the insulating holders 31 are located, contributes to providing the power source connection terminal 35 of the heater module 22L (the plate-like heater body 34) in the bent end portion 31c with no limitation. Thus, even when there is no available space for the power source connection terminal 35 in the end portion of the heater module 22L adjacent to the space at the midpoint in the vehicle width direction, the provision of the power source connection terminal 35 of the heater module 22L is possible.

According to the present embodiment, the heater harness 36 is installed along the main surface from the bent end portion 31c of the insulating holder 31. The heater harness 36 further extends, via the lead wire 37 and the connector 38, to the power supply cable 42 arranged in the space between the battery modules 13FL and 13FR at the front, and between the battery modules 13CL and 13CR at the center. This configuration prevents the heater harnesses of the heater modules 22L and 22R from interfering with cabling of the power supply cable in this space.

According to the present embodiment, the thin attachment surface (the main surface 31m) for the plate-like heater body 34 is placed in each space between the battery modules 13FL and 13FR at the front and the battery modules 13CL and 13CR at the center adjacent to each other in the vehicle front-rear direction (in the cabling direction of the power supply cable). Further, the bent end portions 31c are located in a manner as to face the side surfaces of the battery modules 13CL and 13CR on the sides away from the power supply cable. Accordingly, the spaces between the neighboring battery modules in the vehicle front-rear direction decrease and therefore, the battery pack can be downsized in the vehicle front-rear direction.

The entire contents of Japanese Patent Application No. P2011-054089 (filed on Mar, 11, 2011) and Japanese Patent Application No. P2012-035738 (filed on Feb. 22, 2012) are herein incorporated by reference.

Although the present invention has been described above by reference to the embodiment, the present invention is not limited to the description thereof, and it will be apparent to those skilled in the art that various modifications and improvements can be made.

INDUSTRIAL APPLICABILITY

According to the heater module of the present invention, since the power source connection terminal of the plate-like heater body is arranged not in the module main surface but in the bent arm portion, the original thickness of the heater module does not change. Further, since the power source connection terminal for the heater module is provided in the bent arm portion, the original size of the heater module does not change, either.

Even when the provision space for the heater module is limited, the bent arm portion provided with the power source connection terminal can be placed in the small space, and the heater module thus can surely be attached to the space between the neighboring battery modules in the vehicle front-rear direction.

REFERENCE SIGNS LIST

11 Battery pack
13CL, 13CR Battery module (object to be heated)
13CLa Heated surface
14a Battery module mounting surface
22L, 22R Heater module
31 Insulating holder (L-shaped member)
31c Bent end portion (bent arm portion)
31m Main surface (module main surface)
33 Heat equalizing plate
34 Plate-like heater body
35 Power source connection terminal
42 Power supply cable

The invention claimed is:

1. A heater module provided along a heated surface of a battery module, the heater module comprising:
    a plate-shaped heater body provided outside of the battery module and facing the heated surface, which is a part of an outer surface of the battery module;
    an L-shaped member including a module main surface to which the plate-shaped heater body is provided, and a bent arm portion bent with respect to the module main surface and extended along the outer surface of the battery module, the L-shaped member being provided on a mounting surface on which the battery module is mounted; and
    a power source connection terminal provided between the bent arm portion and the outer surface of the battery module, and connected to the plate-shaped heater body.

2. The heater module according to claim 1, wherein the plate-shaped heater body includes a heat equalizing plate that equally transfers generated heat to the heated surface of the battery module, the heat equalizing plate being formed into an L-shape and extending along the bent arm portion.

3. The heater module according to claim 1, wherein:
    a plurality of battery modules to be heated are provided,
    the battery modules are arranged in a battery pack, and a heated surface of each battery module in a laid state faces the plate-shaped heater body, and
    the L-shaped member is fixed onto a battery module mounting surface in a vertical state such that the bent arm portion is located outside of a region in the battery pack where the battery modules are arranged.

4. The heater module according to claim 3, further comprising:
    a heater harness structured to connect the power source connection terminal to a power supply cable,
    wherein the battery modules are arranged facing each other across the power supply cable, and
    wherein the heater harness is installed along the module main surface from the bent arm portion, and extends to the power supply cable.

5. The heater module according to claim 4, wherein:
    the battery modules are arranged in a cabling direction of the power supply cable, and
    the module main surface is placed between battery modules adjacent to each other in the cabling direction of the power supply cable, such that the bent arm portion faces a battery module side surface away from the power supply cable.

6. The heater module according to claim 1, wherein the battery module is beneath a floor panel of a vehicle.

7. The heater module according to claim 1, wherein the L-shaped member is mounted to a battery pack casing attached to a vehicle body.

* * * * *